(12) United States Patent
Ianna et al.

(10) Patent No.: US 7,922,045 B2
(45) Date of Patent: Apr. 12, 2011

(54) CONDIMENT PACKET

(76) Inventors: Frank Ianna, Franklin Lakes, NJ (US);
Robert Ianna, Franklin Lakes, NJ (US)

( * ) Notice: Subject to any disclaimer, the term of this patent is extended or adjusted under 35 U.S.C. 154(b) by 374 days.

(21) Appl. No.: 12/193,440

(22) Filed: Aug. 18, 2008

(65) Prior Publication Data
US 2009/0050655 A1      Feb. 26, 2009

Related U.S. Application Data

(60) Provisional application No. 60/965,631, filed on Aug. 20, 2007.

(51) Int. Cl.
*B65D 47/10* (2006.01)
(52) U.S. Cl. .................. 222/541.1; 222/107; 383/906
(58) Field of Classification Search ............... 222/541.1, 222/541.3, 541.6, 92, 107; 383/111, 105, 383/47, 90; 215/249, 250
See application file for complete search history.

(56) References Cited

U.S. PATENT DOCUMENTS

| | | | | |
|---|---|---|---|---|
| 2,316,516 A | * | 4/1943 | Hammerstein | 222/490 |
| 3,179,301 A | * | 4/1965 | Lucht | 222/213 |
| 3,595,446 A | | 7/1971 | Hellstrom | |
| 4,696,328 A | * | 9/1987 | Rhodes, Jr. | 222/1 |
| 5,131,760 A | | 7/1992 | Farmer | |
| 5,636,772 A | * | 6/1997 | Poulsen | 222/541.6 |
| 6,126,315 A | * | 10/2000 | Ichikawa et al. | 383/43 |
| 6,549,744 B2 | * | 4/2003 | Terazawa et al. | 399/262 |
| 6,832,852 B2 | | 12/2004 | Wilkes | |
| 7,237,698 B2 | * | 7/2007 | Jackman | 222/541.4 |
| 7,802,703 B2 | * | 9/2010 | Kiser | 222/500 |
| 7,832,601 B2 | * | 11/2010 | Zahn et al. | 222/541.9 |
| 2001/0035427 A1 | | 11/2001 | Mawby et al. | |
| 2003/0071059 A1 | * | 4/2003 | Hagihara | 222/92 |
| 2003/0230604 A1 | * | 12/2003 | Huffer | 222/541.3 |
| 2005/0029276 A1 | | 2/2005 | Johnson et al. | |
| 2007/0228073 A1 | * | 10/2007 | Mazzarino | 222/107 |

FOREIGN PATENT DOCUMENTS

| | | |
|---|---|---|
| JP | 62027547 U | 2/1987 |
| JP | 02114685 U | 4/1990 |
| KR | 2019960001962 Y1 | 3/1996 |

* cited by examiner

*Primary Examiner* — Lien T Ngo
(74) *Attorney, Agent, or Firm* — Woodcock Washburn LLP

(57) ABSTRACT

A condiment packet is configured to be supported on a surface in a free-standing and upright position. The condiment packet is also configured to be easily opened and manipulated with one hand. The body of the condiment packet preferably has a generally pyramidal or conical shape and a generally flat base. The condiment packet may include a resilient band disposed on the condiment packet that flexes when the condiment packet is squeezed and springs back when pressured is released. Also, the condiment packet may be provided with a closure comprising a frangible bubble disposed in the opening of the condiment packet that can be ruptured by squeezing between the thumb and forefingers to open the condiment packet.

14 Claims, 3 Drawing Sheets

CONDIMENT PACKET

CROSS REFERENCE TO RELATED APPLICATION

This application claims benefit of U.S. Provisional Application No. 60/965,631 filed Aug. 20, 2008.

TECHNOLOGY FIELD

This invention relates to packages for holding liquids or other pourable products. More particularly, the invention relates to a quick-opening condiment package that may be manipulated with one hand to dispense condiments.

BACKGROUND

Traditionally, condiments have been packaged in flexible rectangular pouches. Frequently, such flexible rectangular pouches are made of thermoplastic sheet material. Existing condiment pouches are generally fabricated from two rectangular pieces of plastic film that are sealed together along the edges so that the condiment is hermetically sealed within the packet. The sealed packet protects the condiment from exposure to ambient air until the user opens the packet. These packages are typically used for single servings of condiments, such as ketchup, mustard, relish, mayonnaise, soy sauce, hot sauce, and other condiments used by fast food restaurants. To open the packet and dispense the condiment, the user must tear a small portion of the packet and squeeze or pour the condiment from the packet.

There are various problems with these types of packets. In particular, these packets are difficult to open and often require the use of two hands to open and dispense their contents. It is also difficult to accurately direct the condiment onto the food after the packet is open. When the condiment packet is torn open the contents frequently squirt out in unpredictable directions when the packet is squeezed. Further, if not all of the contents of the packet are dispensed, the user must rest the packet on a surface, whereby the opening of the packet may contact the surface and become contaminated, and/or the contents of the packet may dirty the surface.

Accordingly, there is a need for a small condiment packet that may be manipulated with one hand to dispense contents cleanly and efficiently, and may be supported upright on a surface to prevent soiling the surface.

SUMMARY

This Summary is provided to introduce a selection of concepts in a simplified form that are further described below in the Detailed Description of Illustrative Embodiments. This Summary is not intended to identify key features or essential features of the invention, nor is it intended to be used to limit the scope of the invention.

A condiment packet is provided that has a body including an enclosed base and a sidewall that extends upwardly from the base and tapers into a neck portion that defines an opening. Preferably, the body of the condiment packet has a generally flat base and has a generally pyramidal or conical shape, such that the condiment packet may be supported on a surface in a free-standing and upright position. The condiment packet may further include a resilient band disposed on the body that extends across the base and up the sidewall on opposing sides. The resilient band may be adapted to flex when the condiment packet is squeezed and spring back when pressured is released. Also, the condiment packet may include a dispensing tip that extends from the opening of the neck. Further, the condiment packet may be provided with a closure comprising a frangible bubble disposed in the dispensing tip and/or the opening of the neck. The contents of the condiment packet may be dispensed by applying pressure to the frangible bubble and rupturing it.

Additional features and advantages will be made apparent from the following detailed description of illustrative embodiments that proceeds with reference to the accompanying drawings.

BRIEF DESCRIPTION OF THE DRAWINGS

The foregoing summary, as well as the following detailed description, is better understood when read in conjunction with the appended drawings. For the purpose of illustrating the condiment packet, there is shown in the drawings exemplary embodiments; however, the condiment packet is not limited to the specific embodiments disclosed.

DETAILED DESCRIPTION OF ILLUSTRATIVE EMBODIMENTS

Figure 1:
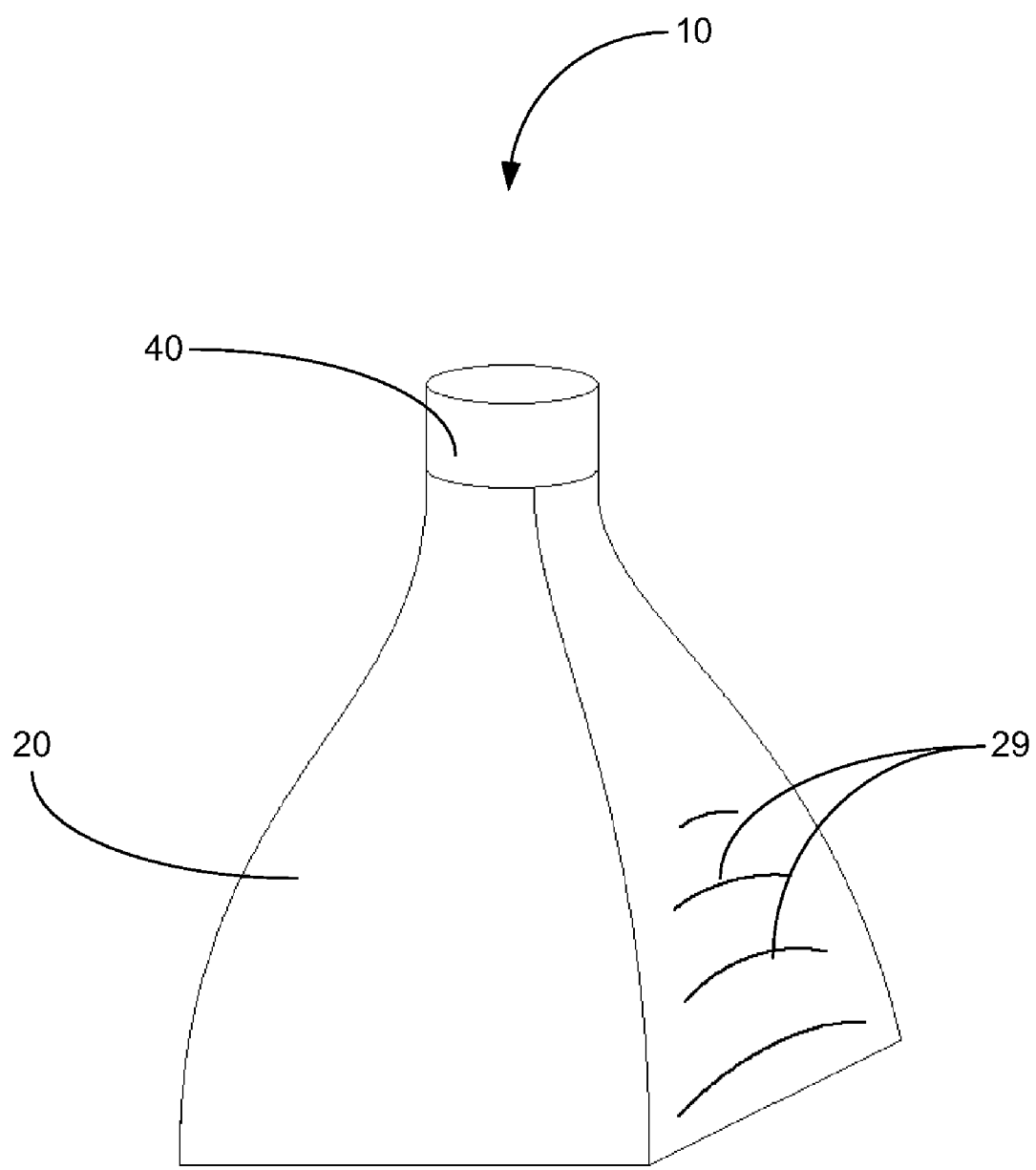
FIG. 1 shows a perspective view of an exemplary condiment packet.

The present invention relates generally to a packet 10 for holding liquids or other pourable products. In particular, the present invention relates to a flexible condiment packet 10 that is configured to be free standing in an upright position and to be opened with one hand. In accordance with one embodiment of the invention, the condiment packet 10 comprises a body 20, a resilient band 30, a dispensing tip 40, and a frangible bubble 50.

Figure 2:
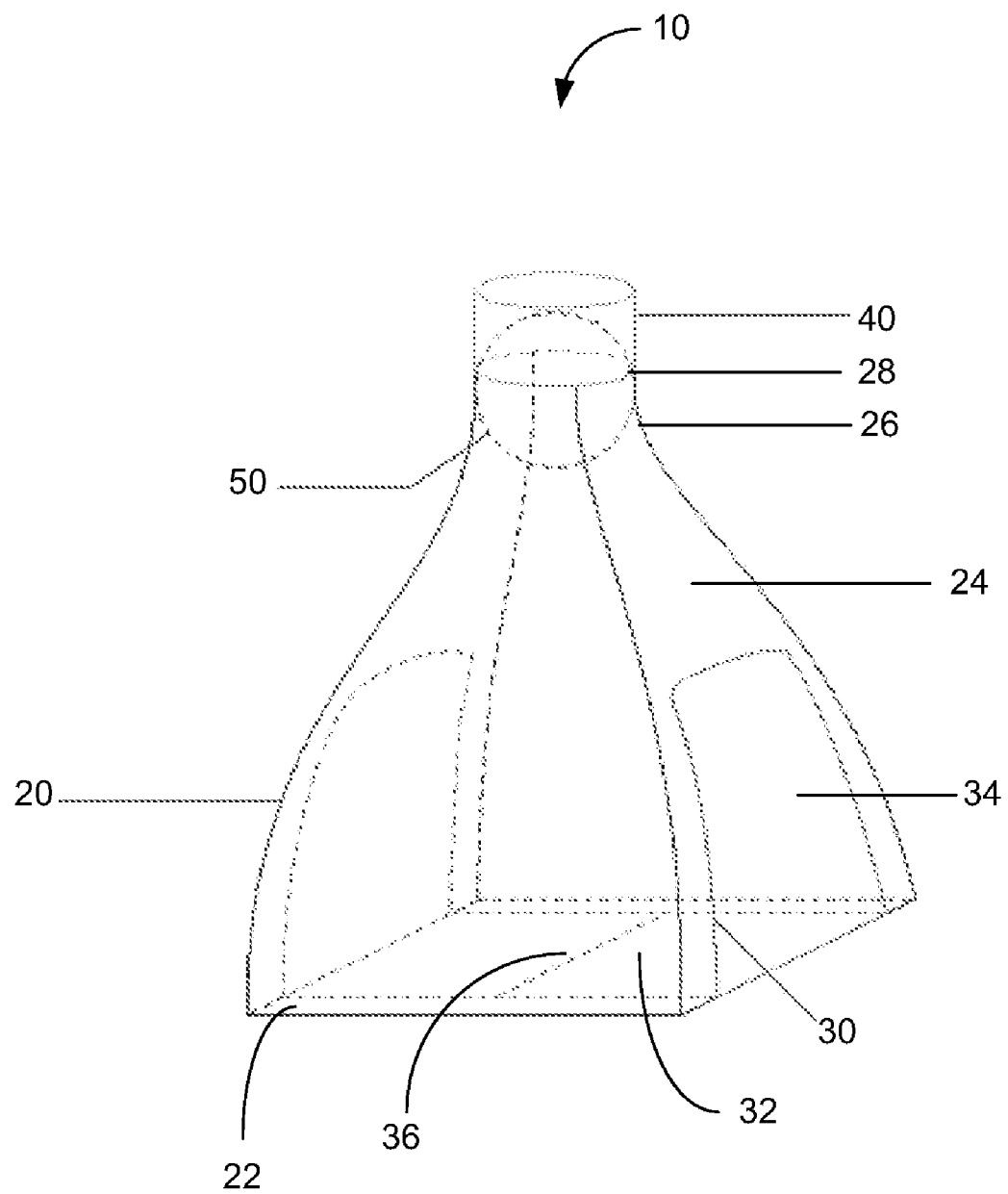
FIG. 2 shows a perspective view of the interior of the condiment packet shown in FIG. 1.

As shown in FIGS. 1 and 2, the body 20 has an enclosed base portion 22 and sidewall 24 that extends upwardly from perimeter of the base portion 22 and tapers into a neck portion 26 that defines an opening 28. The body 20 may be made of any material suitable for containing foodstuffs, such as thermoplastic films, foil-plastic laminates, or paper-plastic laminates. The base portion 22 is configured so that it may be supported on a flat surface. Preferably, the base portion 22 is substantially flat. Additionally, the shape of the base portion 22 may be, for example, polygonal, elliptical, or circular. The configuration of the sidewall 24 corresponds to the shape of the base portion 22. So, for example, if the base portion 22 has a polygonal shape, the sidewall 24 has a number of sides corresponding to the number of sides of the base portion 22. If the base portion has a circular or elliptical shape, the sidewall 24 extends continuously around the perimeter of base portion 22. Thus, as shown, the body 20 of the condiment packet 10 may have a pyramidal or conical shape. Also, as shown in FIG. 1, the sidewall 24 may include textured or ribbed gripping surfaces 29 on at least two opposing sides of the outside surface of the body 20.

Figure 3:
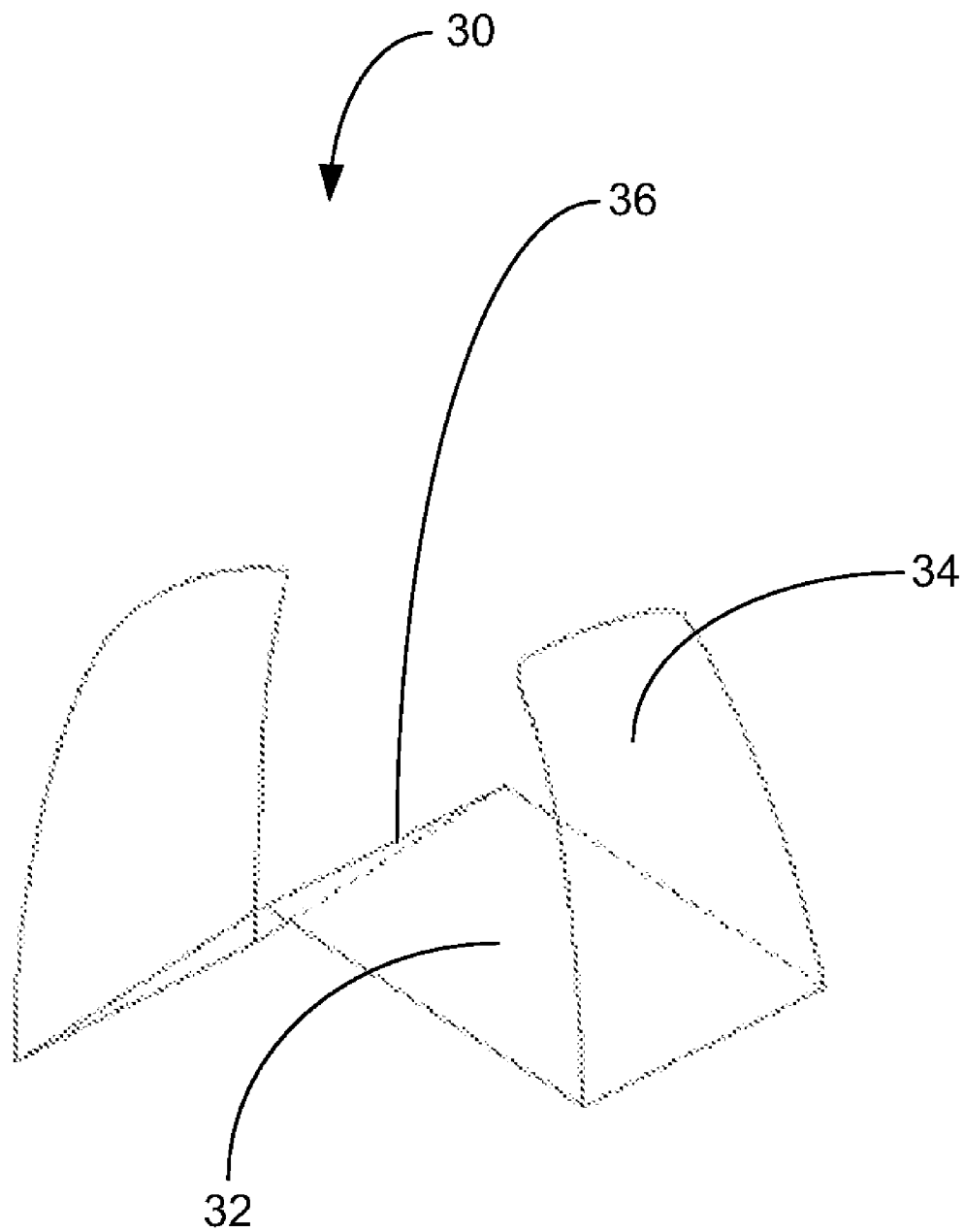
FIG. 3 shows a perspective view of an exemplary resilient element.

As shown in FIG. 2, the body 20 of the condiment packet 10 further includes a resilient band 30 that may be either integrally formed into the body 20 or affixed to the body 20. The resilient band 30 comprises a base 32 and wings 34. The base 32 of the resilient band 30 extends across the base portion 22 and the wings 34 extend up the sidewall 24 on opposite sides of the body 20. The wings 34 preferably extend up the sides of the sidewall 24 having the gripping surfaces 29. As shown, when the resilient band 30 is integrated into the body 20, it has a substantially u-shaped configuration when it is at rest. The resilient band 30 may further comprise a crease 36 that extends across the base 32, transverse to a longitudinal axis of the band 30. Thus, as shown in FIG. 3, when the wings 34 of the resilient band 30 are brought together (as when the packet 10 is squeezed at the respective gripping surfaces 29), the base 32 may collapse along the crease 36. The base 32 of the resilient band 30, however, need not include a crease 36 and may simply collapse or flex by virtue of its material properties. The resilient band 30 is preferably made from a flexible and resilient plastic material, such that the base 32 of the resilient band 30 may collapse or flex when the wings 34 are squeezed together and spring back when the wings 34 are released.

According to one embodiment, as shown in FIGS. 1 and 2, the condiment packet 10 also includes a dispensing tip 40 extending from the neck portion 26 of the body 20. The dispensing tip 40 may be either integrally formed with the body 20 or affixed to the body 20. The shape of the dispensing tip 40 is generally cylindrical, but may include other suitable shapes for dispensing the contents of the condiment packet 10. The dispensing tip 40 is preferably made of plastic, but may be made of other suitable materials. Thus, as shown in FIG. 2, the dispensing tip 40 may be generally configured like a short plastic straw. The dispensing tip 40 provides a well-defined opening for directing the flow of the contents of the condiment packet 10.

As shown in FIG. 2, the body 20 of the condiment packet 10 further includes a frangible bubble 50. The frangible bubble 50 is preferably made of a plastic film and is filled with a suitable (e.g., inert) gas, such that the frangible bubble 50 may be ruptured when pressure is applied. The frangible bubble may be disposed inside the dispensing tip 40 and/or the opening 28 of the neck portion 26 to provide a closure for the condiment packet 10 and prevent the contents from escaping the condiment packet 10 prior to bursting of the bubble 50 by the customer. The material from which the bubble 50 is made is selected so that the bubble 50 will burst upon application of a suitable squeezing force applied by, for example, squeezing the neck portion 26 between the customer's thumb and forefinger. Preferably, the bubble 50 is sufficiently strong that it does not burst during normal handling or squeezing at locations other than the neck portion 26.

Thus, as shown in FIGS. 1-3, the condiment packet 10 may be supported on a surface such that the dispensing tip 40 is held upright. Also, the condiment packet 10 may be opened with only one hand by, for example, holding the dispensing tip 40 between the thumb and forefinger and squeezing. The pressure applied to the dispensing tip 40 with the thumb and forefinger may rupture the frangible bubble 50 and at least partially clear the opening 28 of the condiment packet 10. Once the condiment packet 10 is opened, the contents may be dispensed by holding the condiment packet by the gripping surfaces 29, positioning the dispensing tip 40, and squeezing the wings 34 of the resilient band 40 together. After the contents have been dispensed and pressure is released from the resilient band 30, the resilient band 30 springs back and the body 20 returns substantially to its original shape. Thus, the condiment packet 10 may be supported on a surface in an upright position again.

What is claimed:

1. A condiment packet comprising:
   a base adapted to support the condiment packet when in a free-standing and upright position;
   a sidewall extending upwardly from the base, wherein the sidewall tapers to a neck defining an opening;
   a resilient band disposed across the base and up the sidewall on opposing sides; and
   a frangible bubble disposed in the neck, such that it blocks the opening,
   wherein the base, sidewall and frangible bubble together enclose a condiment within the condiment packet until the bubble is ruptured to enable release of the condiment through the neck.

2. The condiment packet of claim 1 further comprising a cylindrical tip extending from the opening of the neck.

3. The condiment packet of claim 2, wherein the tip is made of plastic.

4. The condiment packet of claim 1, wherein the resilient band is made of plastic.

5. The condiment packet of claim 1, wherein the base is substantially flat.

6. The condiment packet of claim 1, wherein the base has a polygonal shape.

7. The condiment packet of claim 1, wherein the base has a circular shape.

8. The condiment packet of claim 1, wherein the sidewall has ribbed gripping surfaces on opposing sides of the sidewall.

9. The condiment packet of claim 8, wherein the gripping surfaces are disposed on the same opposing sides of the sidewall that the resilient band is disposed on.

10. The condiment packet of claim 1, wherein the frangible bubble is made of a plastic film.

11. The condiment packet of claim 1, wherein the frangible bubble is filled with a gas.

12. The condiment packet of claim 1, wherein the sidewall is made of a thermoplastic film.

13. The condiment packet of claim 1, wherein the sidewall is made of a foil-plastic laminate.

14. The condiment packet of claim 1, wherein the sidewall is made of a paper-plastic laminate.

* * * * *